Dec. 5, 1961  C. J. CASEY  3,011,834
BRAKING APPARATUS
Filed July 1, 1957  4 Sheets-Sheet 1

Dec. 5, 1961 C. J. CASEY 3,011,834
BRAKING APPARATUS
Filed July 1, 1957 4 Sheets-Sheet 4

United States Patent Office 3,011,834
Patented Dec. 5, 1961

3,011,834
BRAKING APPARATUS
Charles J. Casey, 1516 Warren St., Northside,
Pittsburgh, Pa.
Filed July 1, 1957, Ser. No. 669,285
6 Claims. (Cl. 303—71)

This application relates to the art of controlling the braking mechanisms of vehicles and has particular relation to emergency brake control apparatus which operates on the failure of the normal braking apparatus of a vehicle. Application Serial No. 523,715, filed July 22, 1955, for Braking Apparatus, to Charles J. Casey, et al. now abandoned, is incorporated herein by reference.

Emergency brake control apparatus, in accordance with the teachings of the prior art, is typified by Freeman patent 2,270,431. Such apparatus includes an electrical switch which is closed on an excessive drop in the fluid pressure of the braking system causing a relay to actuate a valve. The valve permits exhaustion of the air, which is maintaining the brakes on the vehicle out of braking engagement, causing the application of the brakes.

Such prior art apparatus has the deficiency that the availability of the braking is dependent on proper working of an electrical system including a relay and a switch mechanism. There may be a short circuit or a broken connection in the electrical system, the contacts of the switch or relay may be corroded or dirty, the relay may stick in the deenergized position, or as frequently happens, the generator may fail to charge the battery. Under any one of the above circumstances, the emergency braking system would fail to operate as expected and a dangerous condition would arise.

It is, accordingly, broadly an object of this invention to provide a reliable emergency brake control apparatus which shall operate regardless of the failure of the electrical components of the vehicle which it brakes.

Another and more specific object of this invention is to provide emergency brake control apparatus, the operation of which shall not depend on the proper operating condition of electrical mechanisms such as switches, relays, batteries or generators.

A further specific object of this invention is to provide emergency braking apparatus, the operation of which shall depend only on fluid pressure.

An ancillary object of this invention is to provide a novel fluid pressure valve system, which shall be particularly suitable for use in reliable braking apparatus of the type just discussed but which may have other uses.

A further ancillary object of this invention is to provide novel pressure valves, particularly suitable for use in reliable braking apparatus of the type just described but having general applicability.

A still further ancillary object of this invention is to provide a brake actuating mechanism, particularly suitable for use in reliable braking apparatus but having other uses.

Still another ancillary object of this invention is to provide a reliable readily adjustable dog mechanism, particularly suitabl for use in braking apparatus of the type just discussed while having other uses.

An additional ancillary object of this invention is to provide a reliable fluid pressure drive for braking apparatus of the type just described.

A still further ancillary object of this invention is to provide a novel piston drive particularly adaptable for use in braking apparatus of the type just described but having general applicability.

The brake control apparatus which embodies this invention is integrated into a fail-safe system in which the brakes of a vehicle are set in braking engagement by the force of a spring and are disengaged by the application of fluid pressure to counteract the force of the spring. In accordance with this invention in its specific aspect, two valves, both fluid pressure actuable, are provided for controlling the application of the fluid pressure to counteract the spring force. One of these valves has two positions, in one of which it permits the application of the counteracting fluid pressure, and in the other of which it permits the exhaustion of the fluid which supplies the counteracting pressure. This fluid pressure actuable valve may be set in the first position by the application of fluid pressure to one side of a piston of the valve and in the other position by application of fluid pressure to the opposite side of the piston. The second valve controls the fluid pressure which is applied to the first valve. It has two positions, in one of which it applies pressure setting the first valve in the exhaust position, and in the second of which it supplies fluid pressure for setting the first valve in the supply position. The second valve is normally set in a position such that the first valve exhausts the counteracting pressure fluid but may be moved from this position to a position in which the counteracting fluid pressure is applied to the first valve when adequate pressure from the pressure system is applied. Thus so long as there is adequate pressure in the fluid system the second valve is set so that the brakes are disengaged from braking engagement, but if the pressure drops below a predetermined magnitude, the second valve reverts to a position such that the fluid applying the pressure is exhausted. The application of braking in an emergency by this apparatus according to the invention is dependent only on fluid pressure mechanisms and is entirely independent of any electrical power supply, or electrical conductors, switches or relays.

One of the aspects of this invention is a novel valve for controlling the application of the counteracting fluid pressure. Another aspect of this invention is a novel fluid pressure responsive valve which is responsive to the pressure of the braking fluid in the vehicle to set the first mentioned valve either in a position in which the spring force is counteracted or in the exhaust position.

Another problem raised by the prior art emergency brake control apparatus is the interconnection of the emergency braking system and the brakes of the vehicle. The interconnecting mechanism must not interfere with the normal operation of the brakes and must actuate the brakes effectively in the event of an emergency. A mechanism interconnecting emergency apparatus and the brake on each wheel including a dog which is actuated by a bracket arm is disclosed in application 523,715, now abandoned. While this mechanism has operated highly satisfactorily, difficulty has been encountered in setting the position of the dog relative to the bracket arm with the precision demanded by apparatus of this type.

It is, accordingly, a specific object of this invention to provide an interconnecting mechanism between the brakes of a vehicle and emergency brake control apparatus which shall include reliable and readily operable facilities for setting the position of the dog or other component connected to the brakes relative to the arm or other component of the control apparatus which actuates the component connected to the brakes.

In accordance with a specific aspect of this invention an itnerconnecting mechanism is provided which includes a dog coupled to the cam or brake shaft through a worm and worm gear. The worm is secured to the dog and meshes with the worm gear; the worm gear is keyed to the brake shaft. The dog is actuable by an arm rotatable relative to the gear. The position of the dog relative to the arm and brake shaft is set by rotating the worm. Thus the effects of the wear of the brake lining and other variations may be taken up.

In accordance with another specific aspect of this invention, a drive is provided for the brake actuating mechanism of the emergency brake control apparatus. This drive includes a casing in which a cup is slidably mounted. The cup has a pin near its open end or near its base depending on whether the drive is suspended below the axle or is supported above the axle of the vehicle. The cup is urged towards one end of the casing by a spring and may be moved towards the opposite end by a piston slidable in the main cylinder of the brake control apparatus through which fluid pressure is applied to the piston. The movement of the cup moves the pin in one direction or the other. The pin is coupled to the bracket arm which actuates the dog and thus the brake is controlled.

The novel features considered characteristics of this invention are disclosed generally above. The invention, itself, both as to its organization and its method of operation, together with additional objects and advantages thereof, will be understood from the following description of specific embodiments when read in connection with the accompanying drawings, in which:

FIG. 3 is a view in longitudinal section showing a fluid actuable valve in accordance with this invention which controls the application of the spring counteracting fluid pressure to the brake drive unit;

FIG. 3a is an end view of a chamber spacer of the valve shown in FIG. 3;

FIG. 3b is a view in side elevation of the chamber spacer shown in FIG. 3a;

Figure 1:
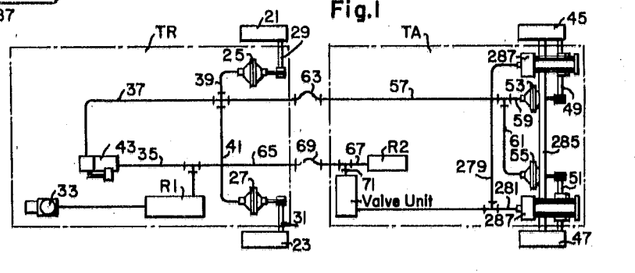
FIG. 1 is a diagrammatic view showing emergency brake control apparatus in accordance with this invention.

The emergency brake control apparatus disclosed herein is provided for the trailer TA of a transport assembly including a tractor TR and the trailer TA. The tractor TR may be of any type available in the industry for example having two wheels 21 and 23 provided with brakes (not shown) actuable by air through diaphragms 25 and 27. The diaphragms 25 and 27 are respectively connected to the brakes through a cam or brake shaft or pin 29, 31. The brake shafts 29 and 31 are rotated on movement of the diaphragms 25 and 27. Normally each diaphragm 25 or 27 is set so that the shaft 29 or 31 is in a position in which the brake is released. On actuation of each diaphragm the cam shaft is rotated to apply the brakes.

The pressure for actuating the diaphragms 25 and 27 is derived from a reservoir R1 which is supplied by a compressor 33. The reservoir R1 is connected through a plurality of conductors 35, 37, 39, 41 and the manually actuable brake control mechanism 43 of the tractor TR to the diaphragms 25 and 27. When the manually actuable brake control mechanism is actuated the fluid pressure is applied to the diaphragms 25 and 27 to rotate the shafts 29 and 31 and apply the brakes.

The trailer TA also has two wheels 45 and 47, for example, which are also equipped with brakes (not shown). In this case again the brakes are actuable by cam or brake shafts or pins 49 and 51 which may be rotated by the application or relaxation of pressure applied to associated diaphragms 53 and 55. The diaphragms 53 and 55 are connected through conductors 57, 59 and 61 including a flexible link 63 to the conductor 37 of the tractor TR which is in turn connected through the manually actuable brake control 43 with the reservoir R1 of the tractor TR. There is, in addition, a reservoir R2 on the trailer TA which is connected and supplied from the reservoir R1 on the tractor TR through conductors 65 and 67 including a flexible link 69.

The apparatus, in accordance with this invention, includes a valve unit and a fluid pressure drive unit and a brake actuating unit, associated with each of the respective wheels 45 and 47. This apparatus is mounted on the trailer TA in the usual practice of this invention. The valve unit is connected to respond to the pressure in the reservoir R2 and to control the fluid pressure drive units in dependence upon the pressure. The brake actuating units are connected to actuate the respective brake shafts 49 and 51. The brake actuating units are actuable by the associated fluid pressure drive units under the control of the valve unit.

Figure 2:
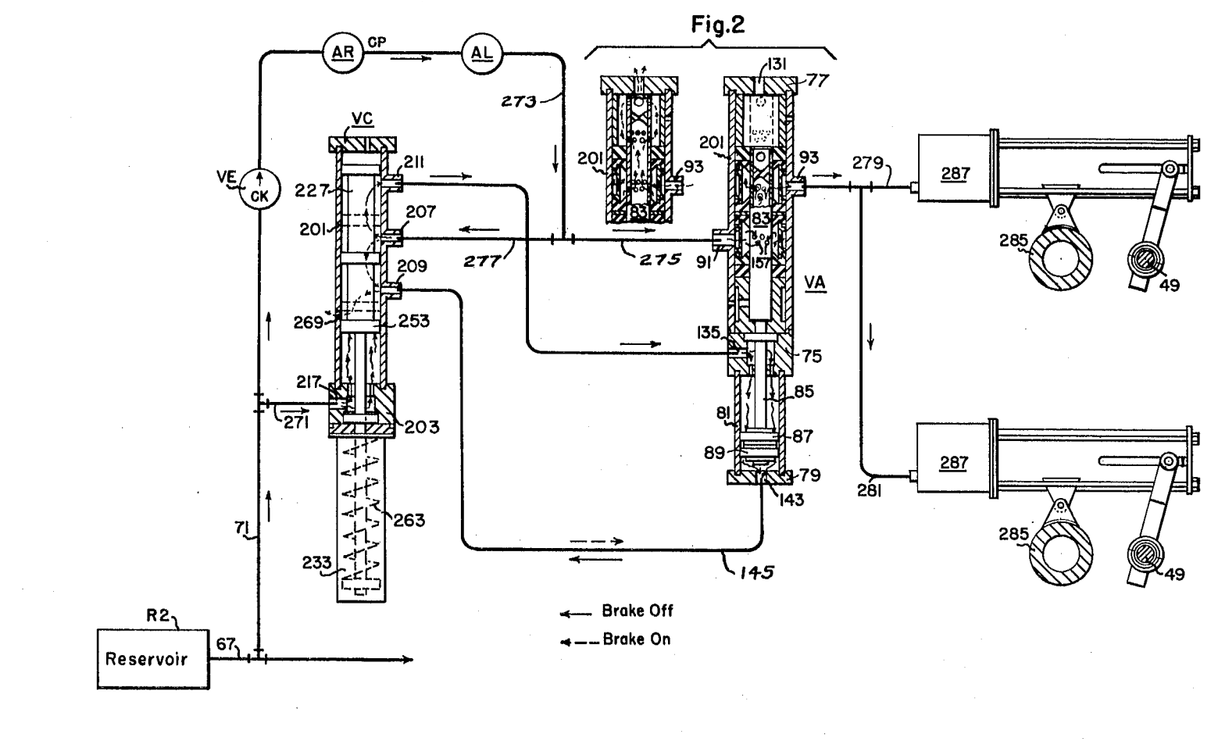
FIG. 2 is a diagrammatic view showing the fluid system of the brake control apparatus of FIG. 1.

The valve unit includes an actuator valve VA, a control valve VC and a check valve VE. In addition, there is an air pressure regulator AR and a lubricator AL. The lubricator AL may be of the type disclosed in application 523,715, now abandoned. The valve unit is connected by a conductor 71 to conductor 67 and through the latter to the reservoir R2.

The actuator valve VA (FIG. 3) includes a generally circularly cylindrical main casing 73, an intermediate block-shaped cylinder head 75, end cylinder heads 77 and 79, and a circularly cylindrical air cylinder 81. In addition, there is a transfer cylinder 83 which is connected to a valve rod 85 carrying cup shaped pistons 87 and 89 of homogeneous rubber at its ends. The casing 73 includes inlet and outlet transfer ports 91 and 93, respectively, at opposite positions of the periphery thereof near the center and leakage ports 95 and 97 near the opposite ends thereof. Only the leakage port 95 is used; the other port 97 is included so that the casing 73 may be assembled in the valve in the reversed position. The casing 73 is closed at one end by the end cylinder head 77 and at the other end by the block cylinder head 75. At each end of the casing 73 spacers 99 and 101 are provided. The spacer 99 at the end adjacent the end cylinder head 77 is an ordinary hollow cylinder. The spacer 101 at the end adjacent the cylinder head 75 is a cylinder having a centrally disposed groove 103 in its periphery and an internal shoulder 105. The groove 103 is connected to the center through a leakage port 107, and to the outside atmosphere through the leakage port 95 which is adjacent the spacer 101. Abutting the spacers 99 and 101 there are a pair of ring shaped spacers 109 and 111 and between these ring shaped spacers chamber spacers 113 and 115 (FIGS. 3a and 3b) are held. Between each of the chamber spacers 113 and 115 and the adjacent ring shaped spacer 109 and 111 there is a U-shaped packing ring 117 and 119 of homogeneous rubber. There are also back-to-back U-shaped rings 121 and 123 of homogeneous rubber between the chamber spacers 113 and 115 with a spacer 124 between the rings. Each of the chamber spacers 113 and 115 (FIGS. 3a and 3b) is of generally cylindrical form including two sets of peripheral ribs 125 and 127. The ribs 125 and 127 permit the chamber spacers to be properly centered in the casing 73. Each of the spacers has a plurality of holes 129 peripherally spaced centrally between its ends. One spacer 115 is so mounted in the casing that these holes 129 are opposite the inlet port 91 and the other spacer 113 is so mounted that its holes 129 are opposite the outlet port 93.

Figures 3, 3A, 3B:
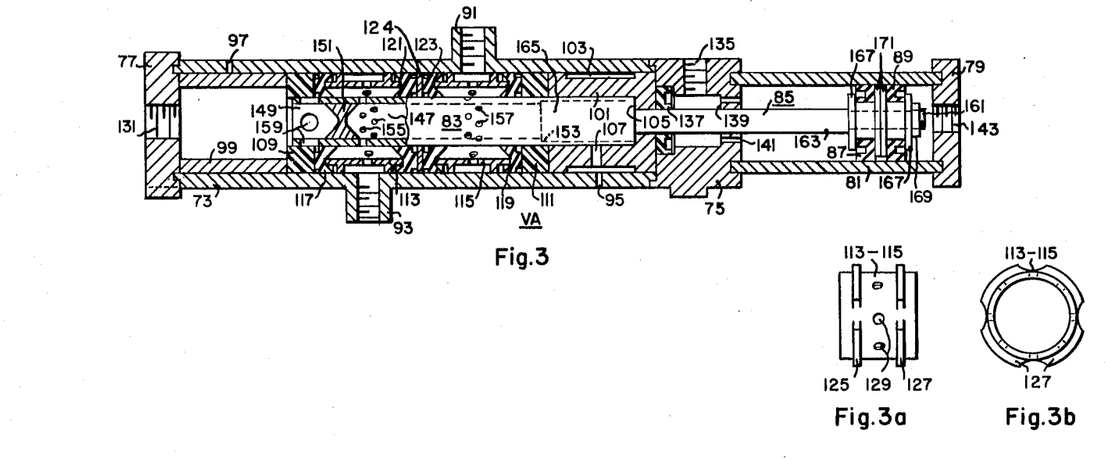

The cylinder head 77 secured to the end of the casing 73 is generally ring shaped having an opening 131 with a tapered pipe thread in the center. An exhaust conductor (not shown) is connected to this threaded opening 131.

The block shaped cylinder head 75 is of generally hollow cylindrical form including a threaded tapered opening 135 and a recess in which packing 137 of homogeneous rubber is disposed. This packing 137 is in the form of a cup-shaped ring. The packing ring 137 abuts the spacer 101. The thread 135 may be an ordinary pipe thread. The cylinder head 75 is provided at the end remote from the ring 137 with a shoulder 139 through which there are a plurality of ports 141.

The air cylinder 81 extends between the cylinder head 75 and the remaining end cylinder head 79. This end cylinder head is generally ring-shaped and has a central threaded opening 143 adapted to engage a conductor 145 (FIG. 2).

The transfer cylinder 83 is a circularly cylindrical rod having an elongated longitudinal opening 147 tapered at the end through one end thereof and a short longitudinal opening 149 tapered at the end through the other end thereof. The tips of the tapered ends are separated by solid material 151 so that there is no communication between the elongated opening 147 through one end and the elongated opening 149 through the other end. Near the end of the transfer cylinder 83 the elongated longitudinal opening 147 is of larger diameter than the remainder of the opening and thus a shoulder 153 is provided. The transfer cylinder is provided with peripheral openings 155 and 157 in its wall adjacent the end of the elongated longitudinal opening 147 and at a distance spaced from this end. The transfer cylinder is also provided with a plurality of openings 159 around the periphery of the short opening 149.

The valve rod 85 includes a stem 161 threaded at the end, an intermediate section 163 of somewhat greater diameter than the stem and a head section 165. The head section 165 is firmly engaged in the portion of the opening 147 of greater diameter abutting the shoulder 153. On the stem 161 the cup-shaped pistons 87 and 89 are mounted back-to-back. The pistons are held on the stem by washers 167 which are secured by a nut 169. Between the pistons, spacers 171 are provided.

The rod-and-transfer-cylinder assembly is mounted with the transfer cylinder 83 slidable in the chamber spacers 113 and 115, and with the intermediate sections 163 of the rod 85 passing through the U-shaped packing ring 137 into the air cylinder 81. The pistons 87 and 89 are slidable in the air cylinder 81. When fluid pressure is supplied through the threaded opening 135 in the cylinder head 75, the fluid flows through the ports 141 applying pressure to the cup-shaped piston 87 facing inward and urging the rod towards the cylinder head 79 at the end of the air cylinder 81. In this position of the rod-and-transfer-cylinder assembly the openings 157 and 155 in the transfer cylinder 83 are opposite the inlet port 91 and the outlet port 93, respectively, so that any air flowing into the port 91 flows through the longitudinal opening 147 of the transfer cylinder 83 and through opening 155 into the outlet port 93. The supply of fluid through the threaded opening 143 in the cylinder head 79 urges the outwardly facing piston 89 inwardly and moves the transfer cylinder 83 correspondingly. In this position of the transfer cylinder the openings 157 are opposite the outlet port 93 and the openings 159 in the end of the transfer cylinder 83 are adjacent the exhaust threaded opening 131 of the cylinder head 77. Any fluid in the system to which the outlet port 93 is connected may then flow through the openings 157 in the transfer cylinder 83 into the space bounded by the spacer 99 and through this space and through the openings 159 in the end of the transfer cylinder through the exhaust 131. Thus any fluid in the system connected to the outlet port 93 may be exhausted.

Figure 4:
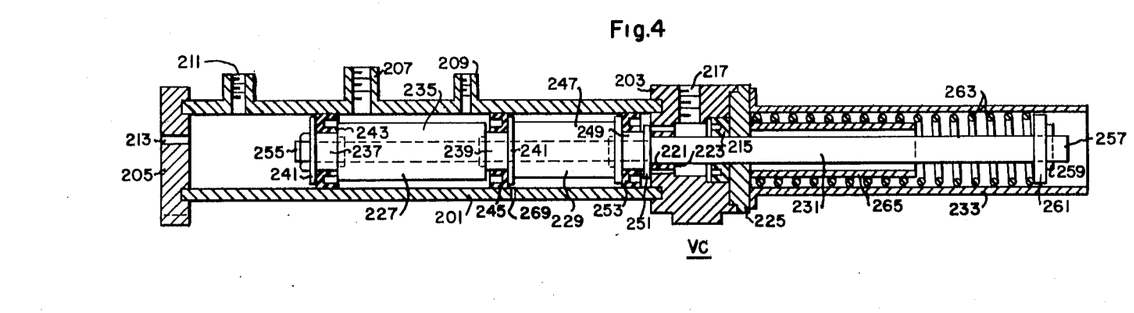
FIG. 4 is a view in longitudinal section showing a fluid actuable valve according to this invention which controls the valve shown in FIG. 3.

The control valve VC includes a main casing 201, a block shaped cylinder head 203 and an end cylinder head 205. The casing 201 is closed by the block shaped cylinder head 203 and by the end cylinder head 205. The casing 201 includes an inlet port 207 and a plurality of outlet ports 209 and 211. The ports 207, 209, 211 may be aligned longitudinally with the outlet ports 209 and 211 on either side of the inlet port 207. The end cylinder head 205 is of ordinary cylindrical form having a leakage port 213. The block cylinder head 203 is the same as the block cylinder head 75 of the actuator valve VA including a recess having a packing cup 215, a lateral opening 217 which has a tapered pipe thread and a plurality of longitudinal ports 221 extending from an internal shoulder 223. The block shaped cylinder head 203 is mounted on the casing 201 with the packing 215 inwardly. The packing 215 is of homogeneous rubber and is retained by a shouldered washer 225 which serves as a spring seat and engages the cylinder head 203.

The valve VC also includes a pair of spools 227 and 229 connected to a valve rod 231 and an end circularly cylindrical casing 233. One of the spools 227 includes a spacer 235 having at its ends retainers 237 and 239. Each retainer 237—239 is in the form of a sleeve having a head 241. Between each head 241 and the adjacent end of the spacer 237—239 a U-shaped packing ring 243 and 245 is provided. The other spool 229 includes a spacer 247 abutting at one end the retainer head of the first spool 227 and abutting an additional retainer 249 at the other end. Between the latter retainer and a spacer 251 there is a cup shaped piston 253. The valve rod 231 includes a stem 255 from which a portion 257 of somewhat greater diameter than the stem extends. The stem 255 is threaded at the end. The portion 257 of greater diameter has an opening at its end which is capable of accommodating a cotter pin 259.

The end cylindrical casing 233 is flanged and is suspended by means of the flange from the spring seat 225. The valve rod 231 extends through the casing 233 and the cylinder head 203 into the main casing 201 and carries the spools 227 and 229. The threaded tip of the valve rod 231 extends through the spool 227 remote from the end casing 233. At the end remote from the threaded tip the rod carries a washer 261 held by cotter pin 259. Between the washer 261 and the spring 225 there is a spring 263. For the purpose of guiding the spring a hollow cylinder 265 extends from the spring seat 225. The cylinder acts as a stop to prevent excessive compression of the spring 263. The rod 231, spring 263 and spools 227 and 229 are held together as a unit.

The spring 263 exerts a force on the washer 261 urging the rod 231 and spools 227 and 229 away from the cylinder head 205 in the casing 201. In this position of the rod the outlet port 207 is connected with the inlet port 209 remote from the end 205 and the outlet port 211 is connected with leakage port 213. The force of the spring 263 may be counteracted by the application of pressure to the piston 253 at the end of the inner spool 229. Fluid to apply the pressure is transmitted to the piston 253 through the ports 217 and 221 in the block cylinder head 203, and urges the piston 253 and the spools 227 and 229 connected to it towards the end of the casing 201. When the outer spool 227 reaches the end of the casing 201, the inlet port 207 is connected to the other outlet port 211 and the first outlet port 209 is connected with a leakage port 269.

The valve VA and the valve VC may be held together by the rods (not shown). One set of tie rods extends from the block 75 and passes through the head 79 and is secured at the head; another set extends from the block 75 and passes through the head 77 where it is secured. The tie rods for valve VC extend from the head 203 and pass through and are held in the head 205.

In the valve unit the reservoir R2 is connected through a conductor 71 and a branch conductor 271 to the port 217 of the block cylinder head 203 of the control valve VC. (See FIG. 2.) The pressure of the fluid transmitted through this port is then directly responsive to the pressure in the reservoir R2 and signals the magnitude of this pressure. The conductor 71 is further connected through the check valve VE, the regulator AR and the lubricator AL and through branch conductors 273 and 275 and 277, respectively, to the inlet ports 207 and 91 of the control valve VC and the actuator valve VA. The outlet port 209 of the control valve VC is connected to the port 143 of the cylinder head 79 of the valve VA. The other outlet port 211 of the control valve VC is connected to the port 135 of the actuator valve VA. The outlet port 93 of the valve VA is connected through conductors 279 and 281 to the fluid pressure drive units.

Figure 5:
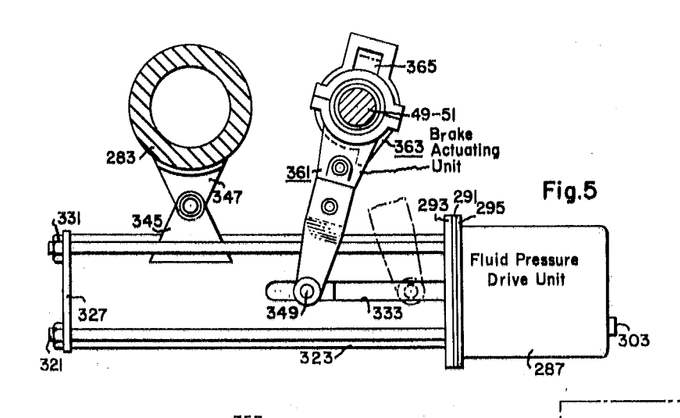
FIG. 5 is a view, partly in side elevation and partly in section of an assembly consisting of a fluid pressure drive unit for the brake and the brake actuating unit, such assembly being constructed for suspension below the axle of the vehicle in which the apparatus is installed.
Figure 6:
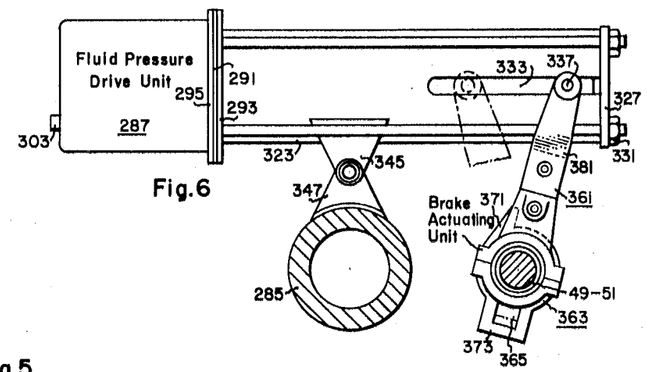
FIG. 6 is a view, partly in side elevation and partly in section of an assembly consisting of a fluid pressure drive unit and a brake actuating unit, such assembly being constructed for mounting above the axle of the vehicle.
Figure 7:
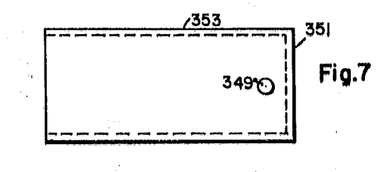
FIG. 7 is a view in side elevation of a cup of the unit shown in FIG. 5.
Figure 8:
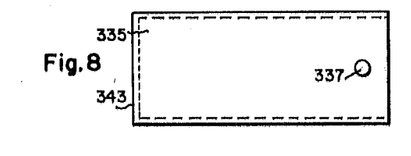
FIG. 8 is a view in side elevation of the cup of the unit shown in FIG. 6.

The fluid pressure drive units are secured to the axle 283 or 285 of the trailer TA. They may be mounted above or below the axle. The drive unit mounted above the axle 285 is shown in FIG. 6. The drive unit mounted below the axle 283 is shown in FIG. 5. In the embodiment actually disclosed herein, the drive unit is mounted above the axle 285 and this unit will be discussed first.

Each drive unit (FIG. 9) includes a generally cup-shaped cylinder 287 within which a piston 289 is slidable. A retainer plate 291 and an end plate 293 are bolted to a flange 295 of the cylinder 287. The retainer plate 291 and end plate 293 each have a pair of openings between which air filters 297 are interposed. The retainer plate carries centrally a bearing 299. The base 301 of the cylinder 287 has an eccentrically placed threaded opening 303 to which the conductor 279 or 281 is connected. The mounting of the drive unit is such that the opening 303 is upward. The supply hose may then be connected to the opening without being excessively flexed. This prevents wear of the hose against the edge of the cylinder.

Figure 9:
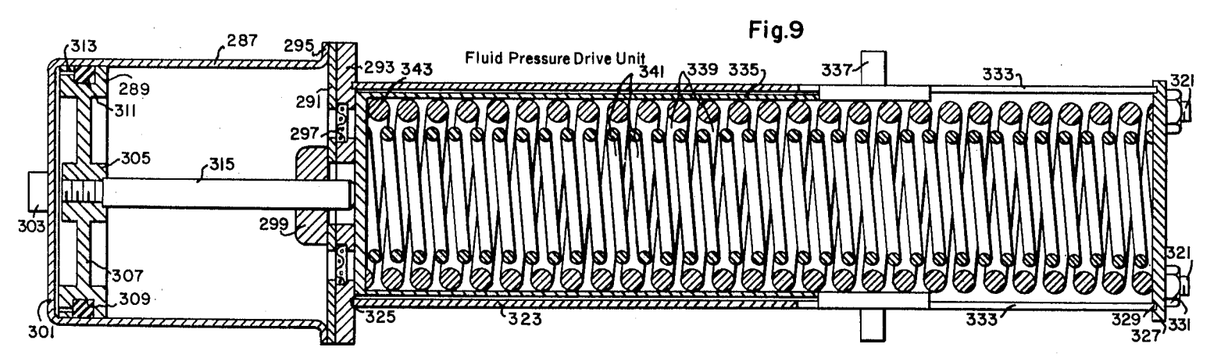
FIG. 9 is a view in longitudinal section of the drive unit of the assembly shown in FIG. 6 produced by a plane in the plane of the drawing.

The piston 289 includes a hub shaped center section 305 integral with a flanged ring 307 having a groove 309 in its rim. Within the groove 309 a packing ring 311 of homogeneous rubber is provided. One of the sides of the groove has openings 313 therein to permit the expansion of the packing ring 311. The piston has mounted centrally thereon a piston rod 315. The rod extends through the bearing 299 in the retainer disk 291 and is slidable in this bearing as the piston 289 moves.

The rod 315 is slidable inwardly and outwardly in the bearing 299 as the piston 289 is moved towards the retainer 291 and away from it. The piston may be moved towards the retainer by the pressure of fluid supplied from the conductors 279 or 281 through the opening 303 in the base of the cylinder 287.

From the end plate 293 a plurality of tie rods 321 having threaded ends extend perpendicular to the end plate. These rods 321 may be secured in threaded holes in the end plate 293. Between the rods a cylindrical casing 323 is mounted perpendicular to the end plate. The casing engages a circular groove 325 in the end plate at one end and is closed by a square plate 327 having a groove 329 which it engages at the other end. The rods 321 extend through the plate 327 and the casing 323 is secured to the end plate 293 by nuts 331 which engage the outer threaded ends of the rods 321. A pair of slots 333 extend from points near the upper end of the casing 323 to the upper end. These slots are in the same plane.

Within the casing, a cup 335 is slidably disposed. This cup has a pair of coextensive pins 337 near its upper end. The pins extend through the slots 333 in the casing 323 and are guided by these slots. The cup 335 is urged towards the end plate 293 by a main spring 339 and a servo spring 341 which engage the base 343 of the cup at one end and the closure plate 327 of the casing 323 at the other end. When the cup is in a position engaging the end plate 293, the pins 337 of the cup are near the ends of the slots 333 remote from the plate 327 (FIG. 9). The cup 335 may be moved towards the outer end of the casing 323 against the force of the springs 339 and 341 by the piston rod 315 when the latter is actuated by the piston 289. The cylinder-casing combination is suspended from a bracket 345 secured to the casing 323. This bracket 345 is in turn pivotally mounted on a bracket 347 secured to the axle.

The fluid pressure drive unit which is adapted to be suspended below the axle 283 is shown in FIG. 5 and is similar to the drive unit shown in FIG. 6 except that in this case the pins 349 extend from points adjacent the base 351 of the cup 353. In this case the casing 323 is reversed and is mounted with the slot 333 adjacent the end plate 293, and the cup 353 is urged towards the end plate 293 of the cylinder 287 by the springs 339 and 341 and is urged in a direction away from the end plate of the cylinder by the piston rod 315 as it moves away from the base of the cylinder.

Figures 10, 11, 12, 13, 14, 15:
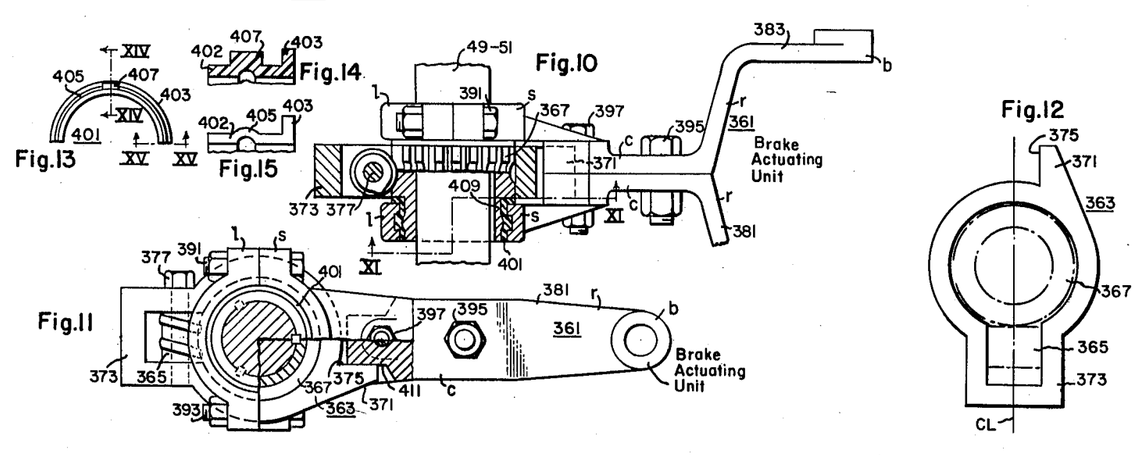
FIG. 10 is a view, partly in section and partly in side elevation of a brake actuating unit in accordance with this invention.
FIG. 11 is a view, partly in section taken along line XI—XI and partly in side elevation, of the brake actuating unit shown in FIG. 10.
FIG. 12 is a view in side elevation of a dog and gear assembly of the unit shown in FIG. 11.
FIG. 13 is a view in side elevation of half of a bearing included in the unit shown in FIGS. 11 and 12.
FIG. 14 is a view taken along the line XIV—XIV of FIG. 13.
FIG. 15 is a view taken along line XV—XV of FIG. 13.

Each brake actuator unit includes a bracket arm 361, a dog 363, a worm 365 and a worm gear 367. The worm gear 367 is mounted on the brake shaft 49 or 51 to rotate therewith. The dog 363 is in the form of a ring shaped plate from which a finger 371 extends at one end and a yoke 373 at the other into which the ring part opens. The finger has a plane face 375 which extends to one side of the center line CL which passes through the center of the ring section. The worm 365 is mounted in the yoke 373 on a bolt 377 which passes through the worm and yoke. The bolt 377 is a press fit in the worm and is thus rigidly secured thereto. The dog 363 is mounted encircling the worm gear 367 with the worm 365 engaging the worm gear. Rotation of the worm 365 causes the dog 363 to pivot and thus the dog may be set in any angular position. When the dog 363 is set in any position rotation of the dog causes rotation of the worm gear 367 and the shaft 49 or 51 to which it is attached by reason of the engagement of the worm with the worm gear.

The arm 361 is in the form of a bifurcated bracket made up of two cooperating parts 381 and 383. Each part includes a central part C from one side of which is generally right angle part r carrying a bearing b at the end extends; a flanged semicircular part s extends in a plane parallel to the central part on the other side. The semicircular part is part of a clamping combination, the other part being a flanged semicircular cap l. The clamping combination is assembled into a unit by bolts 391 and 393 which engage the flanges of the parts s and caps l. The parts 381 and 383 are also bolted together by bolts 395 and 397 at the central part and between the central part and the clamping combination.

The semicircular clamping parts s—1 are each provided with a bearing (FIGS. 13, 14, 15) of a low friction material such as nylon. Each bearing is made up of two semicircular parts 401 one in each of the semicircular clamping parts s and l. Each semicircular part 401 includes a part 402 of extended area from one end of which a lip 403 extends at right angles. The part 402 of extended area has a protuberance 405 along its length, the protuberances on each side terminating in a circular button 407. The bearings 401 are inserted with the protuberances in grooves in the inner surfaces of the clamping semicircular parts s and l. The protuberances prevent displacement of the bearing 401 relative to the clamping parts *l* and *s* in an axial direction, and the buttons 407 prevent rotation of the bearing parts 401 relative to the clamping parts *l* and *s*.

The bracket arm 361 is mounted with the clamping parts *l* and *s* about the shanks 409 of the worm gear 367. The bracket arm 361 is so mounted on the worm gear 367 that the bracket arm is a rigid unit but is capable of rotating about the shanks 409 of the worm gear. The nylon bearing 401 facilitates the rotation.

The bracket arm 361 is mounted with its bearings *b* engaging the pins 337 extending from the cup 335 in the cylindrical casing 323 of the associated fluid pressure drive unit. In a trailer in which the fluid pressure drive unit is mounted above the axle 285 the brake shaft 49—51 is below the slot 333 in the casing 323 of the drive unit and approximately centrally between the ends of the slot. The movement of the pins 337 of the associated fluid pressure drive unit, as the cup 335 is moved, then pivots the bracket arm connected to the pins.

The dog 363 is mounted between the clamping parts *l* and *s* of the bracket arm 361. The bracket arm has a flat face 411 opposite to which the flat face 375 of the dog 363 is mounted. When the bracket arm pivots (in a counterclockwise direction as seen from FIG. 6) the flat face 411 of the bracket arm engages the flat face 375 of the finger 371 moving the dog and the worm 365 connected to it.

In a conventional trailer TA which does not include the emergency brake control apparatus according to this invention, the action of the diaphragms 53—55 on the trailer TA is such that in the absence of fluid pressure transmitted through the manually actuable mechanism 43 of the tractor TR, the shafts 49—51 are rotated to a position in which the brakes are disengaged from the brake drum. With the mechanism 43 in the braking position, the diaphragms 53—55 are so actuated by the fluid as to turn the shafts 49—51 to a position in which the brakes are in braking engagement. The action of the springs 339 and 341 associated with the cylinder in the emergency brake control apparatus disclosed herein is to set the cam shaft in the braking position. This is effected by the actuation by the bracket arms 361 of the dogs 363 under the action of the springs 339 and 341 so that the shafts 49—51 are turned through the worms 365 and worm gears 367 to braking position.

In the standby condition of the trailer TA there is no air in either of the cylinders 287 and under the action of the springs 339 and 341 the cup 335 is in a position adjacent the end plate 293 of the cylinder 287 and the piston 289 is in a position adjacent the base 301 of the cylinder. This is the position in which the cylinder and casing combination are shown in FIG. 9 and in broken lines in FIGS. 5 and 6. In this position of the cup the pins 337 on the cups have pivoted the bracket arms 361 to the braking position. In this position of the bracket arms the dogs 363 are carried by the bracket arm and through the worms and worm gears carry the shafts 49 and 51 so that the brakes are in braking engagement.

When a trailer TA equipped with apparatus in accordance with this invention is to be used, it is connected to a tractor TR and the conductors 57 and 67 of the trailer TA are connected by the flexible cables 63 and 69 to the tractor conductors 35 and 37. The reservoir R2 is then adapted to be supplied from the compressor 33 of the tractor TR with a fluid medium, and the conductors 71, 67, 279 and 281 connected to the reservoir R2 are then adapted to supply the valve unit and the cylinders 287 with the fluid and to build up the fluid pressure in this apparatus.

After the tractor TR and trailer TA are connected and the compressor 33 on the tractor TR is started up, the fluid flows into the inlet port 217 in the block cylinder head 203 of the control valve VC and also into the inlet port 207 in the main casing 201 of the same valve. The flow to the inlet port 217 in the block cylinder head is direct; the flow to the inlet port 207 in the casing is through the check valve VE, the regulator AR and the lubricator AL. The check valve VE prevents the return flow of the fluid medium even if the pressure in the reservoir R2 and the conductors connected to it decreases below that in the inlet port 207 in the casing.

Before the pressure is built up in the reservoir R2 and the conductors connected to it, the control valve VC remains in the retracted position under the action of the spring 263. In this position the fluid which flows into the inlet port 207 in the casing of the control valve VC flows to port 209 and then to the inlet port 143 in the end cylinder head 79 of the actuator valve VA. This fluid builds up pressure behind the piston 89 facing the inlet port 143 and urges the piston, the rod 85 connected to it and the transfer cylinder 83 to a position adjacent the cylinder head 77 at the other end if the cylinder 83 is not already in this position. In this position any air which happens to be in the main cylinders 287 is exhausted through the transfer cylinder 83 and the exhaust port 131 in the end of the valve VA and the brakes on the trailer TA remain in braking engagement.

As the compressor continues to operate, the pressure in reservoir R2 and in the associated conductor 71 builds up. When the pressure exceeds a predetermined magnitude, the piston 253 adjacent the block cylinder head 203 of the control valve VC is moved against the action of the spring 263 and the end spool 227 moves to a position in which the inlet port 207 in the casing is connected to the other outlet port 211 and through it to the inlet port 135 in the block cylinder head 75 of the actuator valve VA. The flow of fluid into the inlet port 135 of the valve VA causes the adjacent piston 87 to be actuated so that the transfer cylinder 83 is moved from its position near the exhaust port 131 to the position in which it connects the inlet port 91 to the port 93 connected to the main cylinders 287. The fluid from the reservoir R2 now flows through the check valve VE, regulator AR and the lubricator AL into the main cylinders 287 urging the pistons 289 away from their bases 301 and correspondingly moving the cups 335 in the casings so that the bracket arms 361 are pivoted away from the dogs 363 permitting the dogs and the shafts 49 and 51 to return to a position in which the brakes are released. The trailer TA may now be pulled by the tractor TR.

If during the use of the equipment, a leak develops reducing the pressure in the reservoir R2 and the conductors connected to it, the pressure counteracting the spring 263 of the control valve VC is reduced. When this pressure is reduced below the maximum by a predetermined magnitude, the spring 263 becomes effective, reverting this control valve to the initial position. The fluid trapped by the check valve VE then flows through the inlet port 207 and the outlet port 209 now connected to it to the inlet port 143 in the end cylinder head 79 of the valve VA, returning the transfer cylinder 83 to the position in which its end is adjacent the exhaust port 131. The fluid in the cylinders 287 is now exhausted under the action of the springs 339 and 341, and the bracket arms 361 are pivoted to a position in which the brakes are again applied. If a leak should occur in the conductors between the port 93 of the actuator valve VA from which the main cylinders 287 are supplied, and the main cylinders, the fluid would leak out of the main cylinders through the leak and the springs associated with the cylinders 287 would return the pistons and pivot the bracket arm so that the brakes would again be applied.

Thus the apparatus operates in a completely fail-safe manner applying the brakes when the fluid pressure is reduced below the safe magnitude. As the brake bands wear, the wear may be taken up by resetting the dogs 363. For this purpose, the bolts 377 carrying the worms 365 are rotated in the proper direction correspondingly rotating the dogs until the dogs are in the proper position with the wear of the brackets and taken up.

In accordance with this invention, an emergency brake control system has been provided which is devoid of any electrical mechanisms such as switches, contacts, relays and the like and is thus not subject to contact sticking or relay sticking, or to the difficulties arising from eroded or dirty contact or open or short-circuits. In the apparatus disclosed herein the operation of the automatic system depends entirely on the fluid itself. This operation is carried out by means of fluid valves which are entirely reliable and fail-proof in their functioning.

An important feature of this invention reside in the shanks 409 of the worm gears which serve to secure the work gears to the shafts 49 and 51 and provide journal surfaces for the bracket arms 361.

While preferred embodiments of this invention have been disclosed herein, many modifications thereof are feasible. This invention, then, is not to be restricted except insofar as is necessitated by the spirit of the prior art.

I claim as my invention:

1. In combination a first valve having a first port, a second port, a third port, a slider having a first position in which it connects said first and second ports and a second position in which it connects said second and third ports, a first piston, a second piston, means connecting said slider to said piston so that when fluid pressure is applied to said first piston said slider is urged to said first position and when fluid pressure is applied to said second piston said slider is urged to said second position, said valve having a fourth port through which fluid pressure may be applied to said first piston and a fifth port through which pressure may be applied to said second piston, a second valve having a first port, a second port, a third port, means connecting said third port of said second valve to said fourth port of said first valve, means connecting said second port of said second valve to said fifth port of said first valve, means connected to said first port of said second valve for applying fluid pressure therethrough, a slider in said second valve having a first position in which it connects said first and second ports of said first valve and a second position in which it connects said first and third ports of said second valve, means maintaining said slider of said second valve in said first position, and fluid pressure responsive means for actuating said slider of said second valve to said second position.

2. Braking apparatus including a brake, a fluid pressure-actuable system provided with a source of fluid pressure, spring means connected to said brake for applying said brake, first fluid-pressure actuable valve means, second fluid-pressure actuable valve means, fluid pressure operable means connected to said spring means for maintaining said brake out of braking engagement when pressurized, first fluid conducting means including said second valve means and connecting said source and said operable means for applying fluid pressure to actuate said operable means, means in said second valve means actuable by fluid pressure applied in a one direction to block the application of fluid pressure through said first conducting means and actuable by pressure applied in the opposite direction to permit the application of fluid pressure through said first fluid conducting means, second fluid conducting means including said first valve means connecting said source to said second valve means to apply fluid pressure in said one direction to said fluid pressure actuable means in said second valve means, third fluid conducting means including said first valve means connecting said source to said second valve means to apply fluid pressure in said opposite direction to said fluid pressure actuable means in said second valve means, means maintaining said second fluid conducting means open and said third fluid conducting means closed in the standby condition of said braking apparatus, fluid pressure responsive means in said first valve means connected to said source for closing and maintaining closed said second fluid conducting means and opening and maintaining open said third fluid conducting means only when the pressure of said source exceeds a predetermined magnitude, and fourth fluid conducting means including said second valve means connected to said operable means when said first fluid conducting means is blocked for exhausting fluid pressure from said operable means so that said brake is applied by said spring means.

3. Braking apparatus including a brake, a fluid pressure actuable system provided with a source of fluid pressure, spring means connected to said brake for applying said brake, fluid pressure actuable valve means, fluid pressure operable means connected to said spring means for maintaining said brake out of braking engagement when pressurized, first fluid conducting means including said valve means and connecting said source and said operable means for applying fluid pressure to actuate said operable means, means in said valve means actuable by fluid pressure applied in a one direction to block the application of fluid pressure through said first conducting means and actuable by fluid pressure in the opposite direction to permit the application of fluid pressure through said first fluid conducting means, second fluid conducting means connecting said source to said valve means to apply fluid pressure in said one direction to said fluid pressure actuable means in said valve means, third fluid conducting means connecting said source to said valve means to apply fluid pressure in said opposite direction to said fluid pressure actuable means in said valve means, means maintaining said second fluid conducting means open and said third fluid conducting means closed in the standby condition of said braking apparatus, fluid pressure responsive means in said valve means connected to said source for closing and maintaining closed said second fluid conducting means and opening and maintaining open said third fluid conducting means only when the pressure of said source exceeds a predetermined magnitude, and fourth fluid conducting means including said valve means connected to said operable means when said first fluid conducting means is blocked for exhausting fluid pressure from said operable means so that said brake is applied by said spring means.

4. Braking apparatus including a brake, a fluid pressure actuable system provided with a source of fluid pressure, spring means connected to said brake for applying said brake, fluid pressure actuable valve means, a check valve, fluid pressure operable means connected to said spring means for maintaining said brake out of braking engagement when pressurized, first fluid conducting means including said check valve and said valve means and connecting said source and said operable means for applying fluid pressure to actuate said operable means, means in said valve means actuable by fluid pressure applied in one direction to block the application of fluid pressure through said first fluid conducting means and actuable by fluid pressure applied in the opposite direction to permit the application of fluid pressure through said first fluid conducting means, second fluid conducting means connecting said source to said valve means to apply fluid pressure in said one direction to said fluid pressure actuable means in said valve means, third fluid conducting means connecting said source to said valve means to apply fluid pressure in said opposite direction to said fluid pressure actuable means in said valve means, means maintaining said second fluid conducting means open and said third fluid conducting means closed in the standby condition of said vehicle, fluid pressure responsive means in said valve means connected to said source for closing and maintaining closed said second fluid conducting means and opening and maintaining open said third fluid conducting means only when the pressure of said source exceeds a predetermined magnitude, and fourth fluid conducting means including said valve means connected to said operable means when said first fluid conducting means is blocked for exhausting fluid pressure from said operable means so that said brake is applied by said spring means.

5. In combination a first valve having a first port, a second port, a third port, a slider having a first position in which it connects said first and second ports and a second position in which it connects said second and third ports, piston means having opposite pressure responsive faces, said slider being urged to said first position when pressure is applied to one of said faces and said slider being urged to said second position when pressure is applied to said other face, said valve having a fourth port through which fluid pressure may be applied to said first piston and a fifth port through which pressure may be applied to said second piston, a second valve having a first port, a second port, a third port, means connecting said third port of said second valve to said fourth port of said first valve, means connecting said second port of said second valve to said fifth port of said first valve, means connected to said first port of said second valve for applying fluid pressure therethrough, a slider in said second valve having a first position in which it connects said first and second ports of said first valve and a second position in which it connects said first and third ports of said second valve, means maintaining said slider of said second valve in said first position, and fluid pressure responsive means for actuating said slider of said second valve to said second position.

6. Braking apparatus including a brake, a fluid pressure actuable system provided with a source of fluid pressure, spring means connected to said brake for applying said brake, fluid pressure operable means connected to said spring means for maintaining said brake out of braking engagement only when pressurized, first valve means having a first position and a second position and including pressure actuable means for setting said valve means in one position or the other in dependence upon actuating pressure, means connecting said source to said valve means responsive to the pressure of said source and cooperative with said pressure actuable means to set said valve in said first position when the pressure of said source exceeds a predetermined magnitude and in said second position when the pressure of said source is less than a predetermined magnitude, second valve means having a first position and a second position and including actuating means for setting said second valve means in said first or second position in dependence upon the actuation of said actuating means, means connected to said source, to said second valve means and to said fluid pressure operable means for pressurizing said operable means with said second valve means in its first position thus maintaining said brake out of braking engagement and for relieving the pressure on said operable means with said second valve means in its second position thus applying the brakes, and means connecting said second valve means to said first valve means and cooperative with said actuating means for setting said second valve means in its first position when said first valve means is in its first position and for setting said second valve means in its second position when said first valve means is in its second position.

References Cited in the file of this patent
UNITED STATES PATENTS

| | | |
|---|---|---|
| 1,115,286 | Costelloe | Oct. 27, 1914 |
| 1,421,408 | Collyer | July 4, 1922 |
| 1,782,571 | Hukill | Nov. 25, 1930 |
| 1,792,895 | Cowlishaw | Feb. 17, 1931 |
| 2,012,011 | Keller | Aug. 20, 1935 |
| 2,156,006 | Williams | Apr. 25, 1939 |
| 2,211,890 | Farmer | Aug. 20, 1940 |
| 2,311,842 | Larson | Feb. 23, 1943 |
| 2,409,908 | Simpkins | Oct. 22, 1946 |
| 2,670,817 | Tripp | Mar. 2, 1954 |
| 2,757,763 | Burger | Aug. 7, 1956 |
| 2,783,020 | Kleczek | Feb. 26, 1957 |
| 2,852,039 | Dotter | Sept. 16, 1958 |
| 2,854,954 | Howze | Oct. 7, 1958 |
| 2,871,827 | Euga | Feb. 3, 1959 |
| 2,896,666 | Rockwell | July 28, 1959 |